(12) United States Patent
Faulkner

(10) Patent No.: US 10,800,618 B1
(45) Date of Patent: Oct. 13, 2020

(54) ALIGNMENT SYSTEM AND METHOD FOR A CONCRETE TRUCK AT A CONCRETE PLANT OR A CEMENT TANKER AT A CEMENT LOADING STATION

(71) Applicant: George Wayne Faulkner, Flowery Branch, GA (US)

(72) Inventor: George Wayne Faulkner, Flowery Branch, GA (US)

(*) Notice: Subject to any disclaimer, the term of this patent is extended or adjusted under 35 U.S.C. 154(b) by 0 days.

(21) Appl. No.: 16/872,087

(22) Filed: May 11, 2020

Related U.S. Application Data

(60) Provisional application No. 62/984,808, filed on Mar. 4, 2020.

(51) Int. Cl.
| | |
|---|---|
| *G01S 13/06* | (2006.01) |
| *G01S 13/88* | (2006.01) |
| *B65G 65/00* | (2006.01) |
| *G01S 13/04* | (2006.01) |
| *B65G 69/00* | (2006.01) |
| *B65G 67/06* | (2006.01) |

(52) U.S. Cl.
CPC .......... *B65G 65/005* (2013.01); *B65G 67/06* (2013.01); *B65G 69/006* (2013.01); *G01S 13/04* (2013.01); *G01S 13/88* (2013.01); *B65G 2203/042* (2013.01); *B65G 2814/0323* (2013.01)

(58) Field of Classification Search
None
See application file for complete search history.

(56) References Cited

U.S. PATENT DOCUMENTS

| | | | | |
|---|---|---|---|---|
| 5,203,628 | A * | 4/1993 | Hamm | B28C 9/0454 366/2 |
| 10,703,569 | B2 * | 7/2020 | McNeilus | B28C 5/4251 |
| 2005/0174879 | A1 * | 8/2005 | Bentley | B28C 7/022 366/3 |
| 2014/0269145 | A1 * | 9/2014 | Fasana | B28C 5/4237 366/41 |
| 2020/0013285 | A1 * | 1/2020 | Wang | G08G 1/133 |

* cited by examiner

Primary Examiner — John F Mortell
(74) Attorney, Agent, or Firm — Richard G Topolewski

(57) ABSTRACT

A concrete truck or cement tanker truck alignment system with a loading station having a discharge chute, an electronic sensor that sees through dust or an environmental dust shield, and provides location information used to determine a hopper offset. The hopper offset is a measurement of the physical offset between a feed hopper on the truck and the discharge chute. The system may further include an alignment feedback unit that provides feedback based on the hopper offset. The alignment feedback unit may indicate the hopper offset is within an alignment tolerance. The sensor may use radar. The alignment feedback unit may provide auditory or graphical feedback. The graphical feedback may show a discharge icon representing the position of the discharge chute and a hopper icon representing the feed hopper where the location of the hopper icon is relative to the discharge chute based on the hopper offset.

20 Claims, 10 Drawing Sheets

ALIGNMENT SYSTEM AND METHOD FOR A CONCRETE TRUCK AT A CONCRETE PLANT OR A CEMENT TANKER AT A CEMENT LOADING STATION

CROSS-REFERENCE TO RELATED APPLICATION

This application claims the benefit of U.S. Provisional Application No. 62/984,808, filed Mar. 4, 2020.

BACKGROUND OF THE INVENTION

Field of the Invention

The invention relates generally to the cement and concrete trucking industry, more particularly, to a system and method to help position trucks so a feed hopper on a concrete truck is aligned to the discharge chute at a concrete plant and the inlet hole of a cement tanker is aligned to the discharge chute at a cement plant.

Background of the Invention

In the cement industry the dry powder cement originates from a big cement factory. At the cement factory there are cement terminals where the dry powder cement is stored in large overhead silos that a cement transport tanker (also known as a cement hauler truck or cement tanker) will drive under and align the inlet hatch to a discharge chute that fills the cement tanker with dry powder cement. The cement tanker may take the dry powder cement to smaller cement distribution plants in other cities for further distribution or the cement tanker may take the dry powder cement to a concrete plant.

The concrete plant can be a permanent structure or a modular cement plant that can be setup near a job site. At the concrete plant machinery gathers the concrete ingredients to make a batch of concrete. The concrete ingredients are specific amounts of cement, aggregate (mainly rocks and sand) and water plus any additives to give the concrete the desired properties for the intended use of the concrete (e.g. color, extra strength, longer working time, shorter set time, etc.).

At the concrete plant a ready mix concrete truck will often back in or pull under and align the feed hopper on the truck to a discharge chute of a loading station of the concrete plant. The ready mix concrete truck has a rotating cone-shaped mixer that keeps the concrete mixing while it is in transport to the job site.

The concrete plant may be a dry mix plant or a wet mix plant. The dry mix plant will feed the dry materials through the discharge chute and into the feed hopper of the truck where it will enter the rotating cone shaped mixer, and then the dry mix plant will send the proper amount of water through the feed hopper to join the dry materials in the rotating cone shaped container. The ready mix truck will mix up the concrete as it drives to the job site. A wet mix concrete plant (also known as a central batch mixer) will combine all the ingredients including the water and mix it before feeding it through the discharge chute and into the feed hopper of the cement truck.

For a busy concrete plant aligning the feed hopper of the truck to the discharge chute of the concrete plant is important and sometimes is the limiting factor for the amount of concrete that can be provided by the concrete plant to a job site. When volume is important a dedicated person may guide the cement trucks to align the feed hopper with the discharge chute. The problem of aligning the feed hopper to the discharge chute is difficult because of the dust involved and a shroud often found around the discharge chute. Often the shroud is used along with a ceiling air intake system while the concrete truck is being loaded (also known as being charged in the industry) to limit the amount of dust that escapes. If the dust were allowed to escape it would soon coat everything at the concrete plant and the surrounding area. Similar alignment challenges can exist at cement plants due to the dust.

Several alignment devices, cameras, light systems etc. have failed. For example video equipment that may normally be used to provide a visual image to help with alignment cannot be used if mounted outside the shroud because the shroud cannot be seen through, even if the shroud is made of clear material it will soon be covered in dust and no image of the discharge chute and feed hopper can be provided. If instead the concrete plant would mount the camera inside the shroud that camera lens would quickly get covered with dust and again become inoperative.

What is needed is a way to help align the trucks that can deal with the inhospitable environment of the dust and shrouds found at concrete plants and cement terminals.

SUMMARY OF THE INVENTION

The present disclosure describes a concrete truck alignment system with a loading station having a discharge chute, a sensor that is electronic and sees through dust or an environmental dust shield where the sensor provides location information used to determine a hopper offset. The hopper offset is a measurement of the physical offset between a feed hopper on a concrete truck and the discharge chute. The system may further include an alignment feedback unit that provides feedback based on the hopper offset. The alignment feedback unit may indicate the hopper offset is within an alignment tolerance. The sensor may use radar. The alignment feedback unit may provide auditory or graphical feedback. The graphical feedback may show a discharge icon representing the position of the discharge chute and a hopper icon representing the feed hopper where the location of the hopper icon is relative to the discharge icon and the relative location is based on the hopper offset. The sensor may be mounted on the loading station or the concrete truck. The hopper offset may indicate if the concrete truck should move forward or backward.

The sensor may be able to see through both dust and the environmental dust shield. The method may have the sensor mounted on the loading station. The system may have the sensor mounted on the concrete truck. The hopper offset may indicate if the concrete truck should move forward or backward. The system may provide feedback using a computer network address.

A concrete truck alignment method that includes receiving location information from an electronic sensor that sees through dust or an environmental dust shield, and determining a hopper offset from the location information where the hopper offset provides physical offset information about a feed hopper on a concrete truck relative to a discharge chute on a loading station. The method may include providing feedback based on the hopper offset using an electronic feedback unit. The sensor may use radar. The sensor may see through both dust and an environmental dust shield. The process may include providing feedback using auditory feedback or graphical feedback. The graphical feedback may show a discharge icon representing the position of the discharge chute and a hopper icon is located relative to the discharge icon where the offset of the hopper icon is relative to the discharge icon and the relative location is based on the hopper offset. The method may provide feedback using a computer network address. The sensor location information may come from a sensor that is mounted on the loading station.

A concrete truck alignment system including a loading station with a discharge chute, a sensor, and an alignment feedback unit. The sensor may use radar in the 75 to 100 GHz range to provide location information, where the location information is used to determine a hopper offset, where the hopper offset is the distance between a feed hopper on a concrete truck and the discharge chute. The alignment feedback unit provides feedback based on the hopper offset, where the alignment feedback unit shows a discharge icon representing the position of the discharge chute and a hopper icon representing the feed hopper, where the location of the hopper icon is relative to the discharge icon and the relative location of the hopper icon is based on the hopper offset. The alignment feedback unit may indicate when the hopper offset is within an alignment tolerance.

DETAILED DESCRIPTION

Figure 1A:
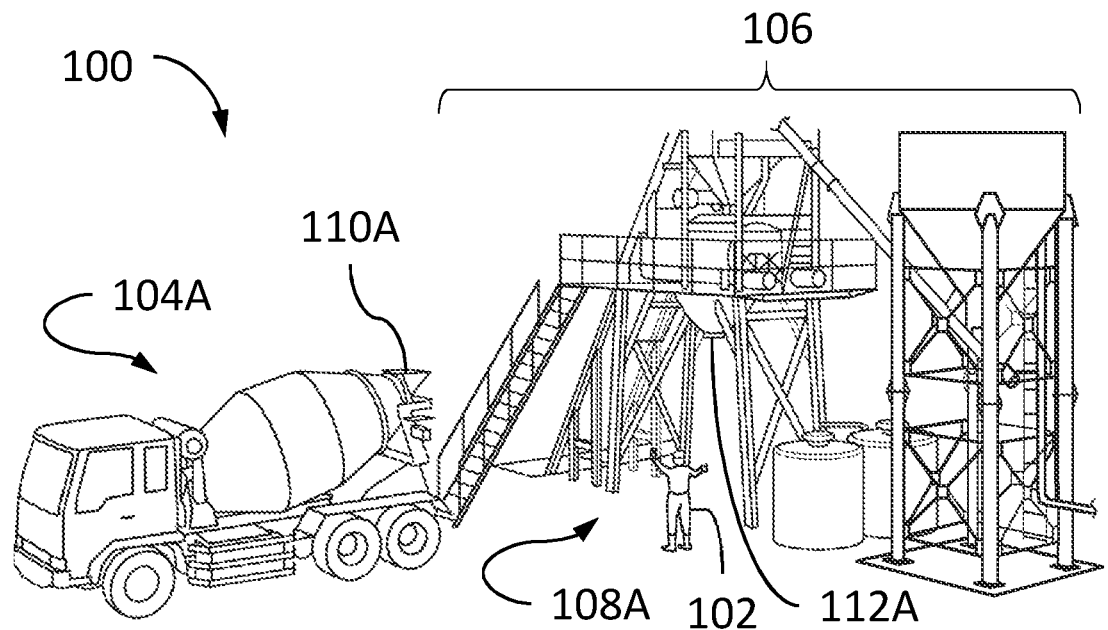
FIGS. 1A and 1B illustrates the prior art of a dedicated person helping align a concrete mixer truck at a concrete plant.

FIG. 1A depicts a scene 100 of the prior art of a dedicated person 102 helping backup a concrete mixer truck 104A at a concrete plant 106 to a concrete loading station 108A. The concrete mixer truck 104A has a feed hopper 110A that should align to a concrete discharge chute 112A of the concrete loading station 108A.

Figure 1B:
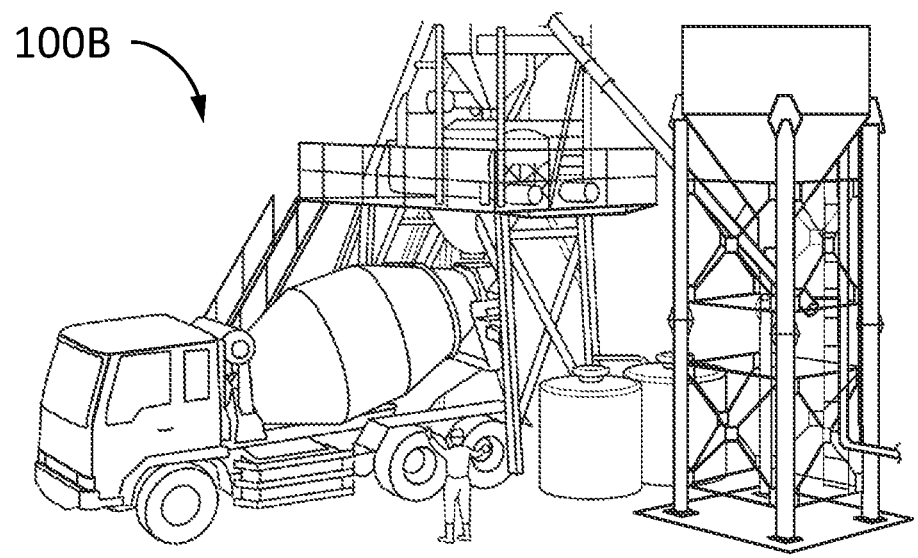

FIG. 1B depicts a scene 100B of the prior art after the concrete truck 104B has been successfully backed-up and aligned to the concrete loading station 108A so that the feed hopper 110A and the concrete discharge chute 112A are aligned. In the aligned configuration the material (e.g. concrete) can move from the concrete discharge chute 112A into the feed hopper 110A of the concrete mixer truck 104A. If the feed hopper 110A is not properly aligned to the concrete discharge chute 112A, then when the material is released the materials will spill on the ground and not arrive in the truck mixing chamber. This will waste materials, and if this is a dry mix plant then the wasted materials maybe hard to notice and may affect the quality of the concrete.

Environmental dust shields, for example in the form of rubber curtains may enclose the concrete loading station 108A. Dust shields may enclose the entry of an enclosed loading station during the filling operation.

Concrete plants 106 come in many different types and styles. Concrete plants 106 can be portable units that can be disassembled and are design to be trucked to and setup near job sites. Concrete plants 106 can be purchased systems that are permanently or semi-permanently setup. Concrete plants 106 can be permanent stationary installations capable of producing large quantities of concrete with the largest concrete plants 106 having multiple concrete loading stations 108A.

A feed hopper 110A is also known as a charging hopper, input hopper, inlet hopper, entry hopper, truck inlet chute or truck entry chute. A feed hopper 110A is where material can enter a concrete mixer truck 104A. The material may be dry powder cement, aggregates (e.g. rocks and sand), other concrete additives, and water; pre-mixed concrete; or other things relevant to making concrete.

A concrete mixer truck 104A is also known as a ready mix concrete truck, ready mix truck, mobile mixing truck, a ready mix mobile mixing truck, a truck mixer, a transit mixer (TM) or concrete mixer. A concrete mixer truck 104A carries the ready mix concrete to the job site, which is often a construction site. A concrete mixer truck 104A has a mixing chamber, typically a revolving drum with built in blades that the concrete mixer truck 104A may continuously rotate to mix the concrete as the concrete mixer truck 104A drives to the job site.

A concrete discharge chute 112A is also known as a discharge hopper, or a ready mix concrete plant discharge chute. The concrete discharge chute 112A is the point where material is discharged from the concrete loading station 108A into the feed hopper 110A of a concrete mixer truck 104A.

Figure 2A:
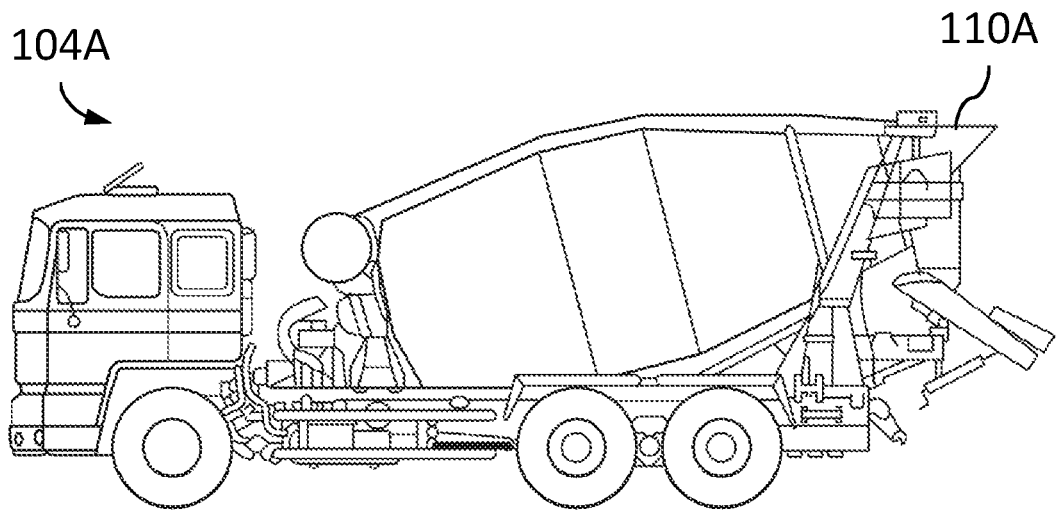
FIG. 2A illustrates a concrete mixer truck.

FIG. 2A illustrates a concrete mixer truck 104A with a feed hopper 110A. The concrete mixer truck 104A shown has the feed hopper 110A in the rear, alternative configurations of the concrete mixer truck 104A has the feed hopper 110A located in the front.

Figure 2B:
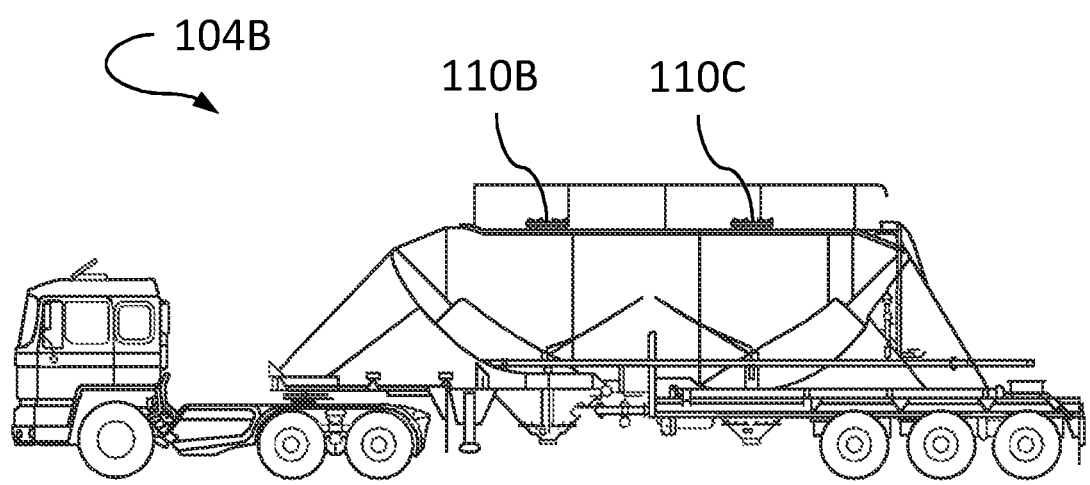
FIG. 2B illustrates a cement hauler.

FIG. 2B illustrates a cement hauler 104B, with intake hatches 110B and 110C. The cement hauler 104B transports dry powder cement in a large container, the large container is enclosed and transports the cement powder in loose form (i.e. not in bags). The cement powder is usually discharged through a pipe with the help of compressed air from a compressor on the cement hauler 104B. A cement hauler 104B can have two intake hatches 110B and 110C, as depicted, or may have more or less intake hatches 110B and 110C.

A cement hauler 104B is also known as a cement transport tanker, cement transport tanker truck, cement tanker, cement transporting truck, a cement bulker, or cement tanker truck. The cement hauler 104B may be filled at a cement terminal located at either a cement manufacturing plant or a cement distribution center. The cement hauler 104B can transport the raw cement powder to a cement distribution center or a concrete plant 106.

Intake hatches 110B and 110C are also known as inlet holes, or inlet chutes.

Figure 3A:
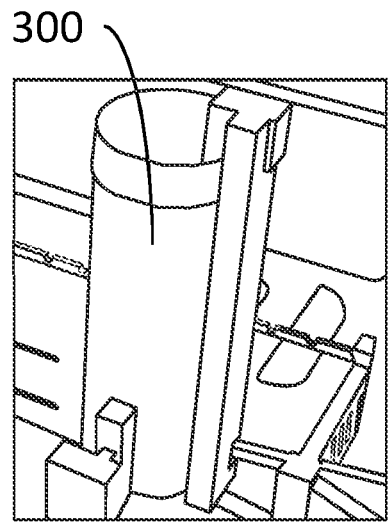
FIGS. 3A, 3B and 3C illustrate a cement hauler at a cement plant.
Figure 3B:
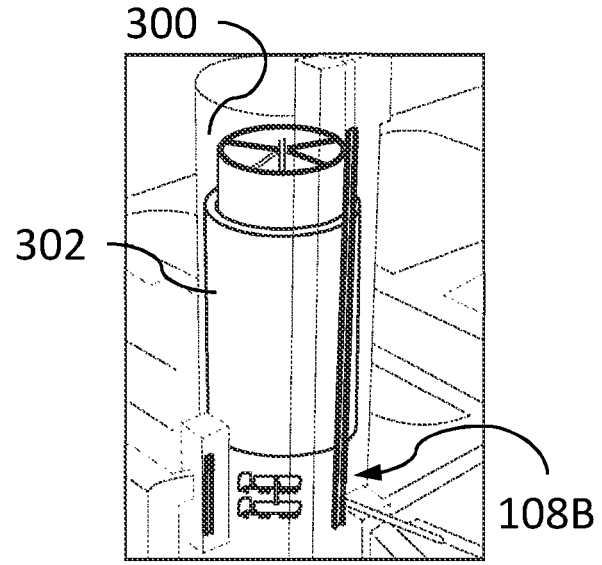
Figure 3C:
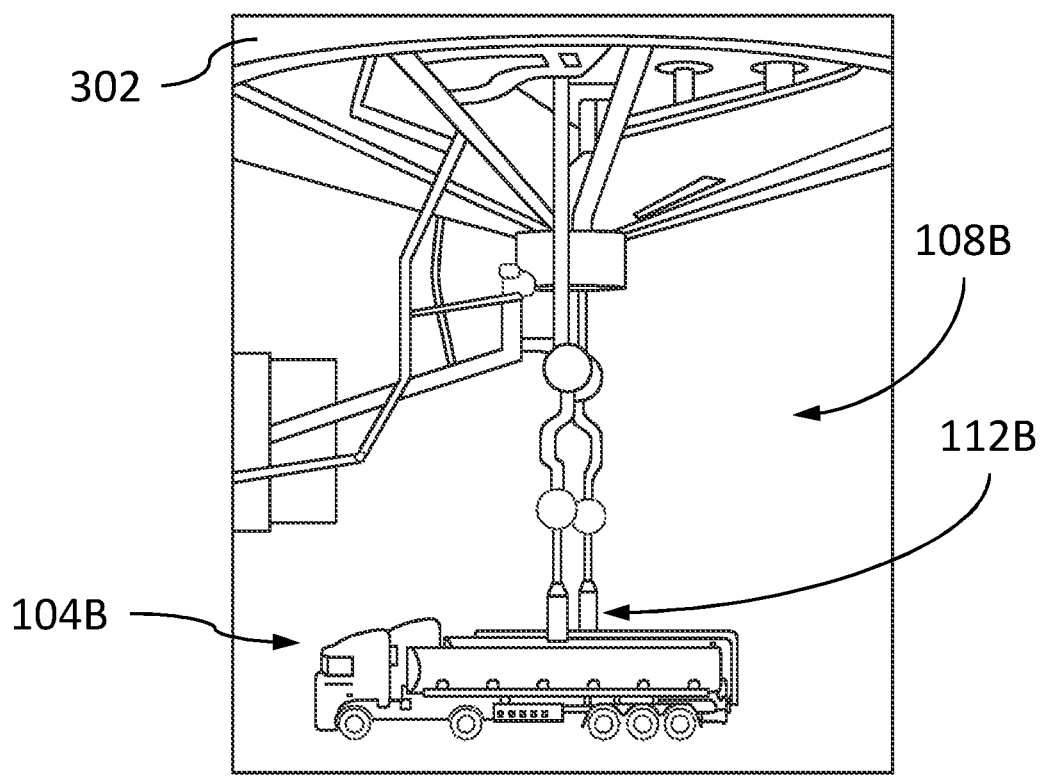

FIG. 3A shows the outside of a cement terminal 300 at a cement manufacturing plant also known as a cement plant. FIG. 3B shows the interior of the cement terminal 300 with a powder cement storage vessel 302 and cement loading stations 108B at the ground level. FIG. 3C illustrates the cement loading stations 108B where cement haulers 104B are filled through cement discharge chutes 112B into intake hatches 110B and 110C.

The cement discharge chute 112B is also be known as a cement terminal discharge chute, a discharge hopper, a cement distribution plant discharge chute, a cement terminal discharge hopper, or plant exit boot.

A cement terminal 300 may be found at a cement manufacturing plant or a cement distribution center. Cement terminals come in many different shapes, sizes and configurations but in general a cement terminal 300 will have one or more cement loading stations 108B with a cement discharge chute 112B that a cement hauler 104B can drive under and once the cement discharge chute 112B is aligned to the intake hatch 110B or 110C then the dry cement powder maybe sent through the cement discharge chute 112B to fill a cement hauler 104B. The cement hauler 104B should properly align the intake hatch 110B or 110C underneath the cement discharge chute 112B before starting the filling of the cement hauler 104B to avoid waste from spillage and to minimize dust.

Figure 4:
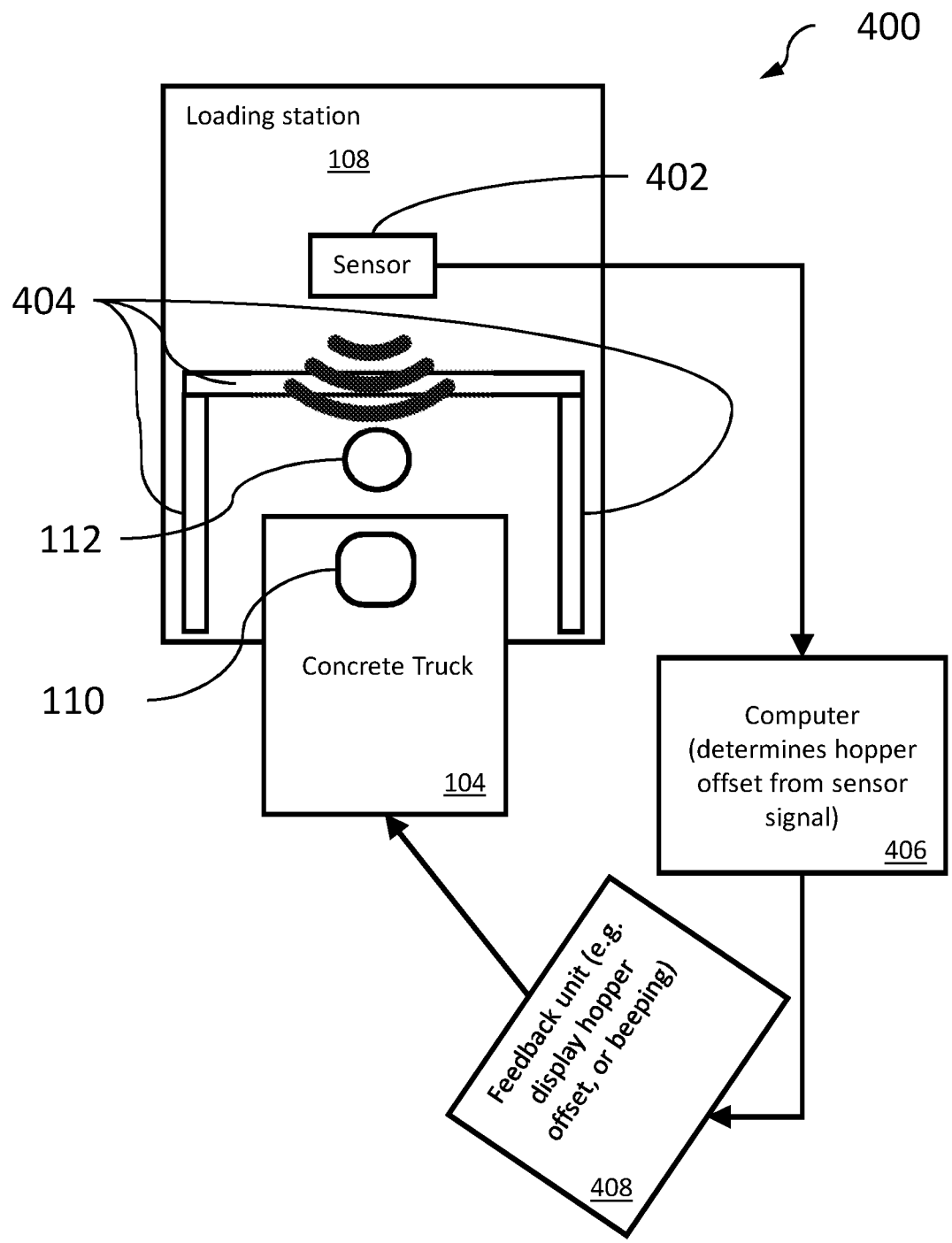
FIG. 4 is a diagram of a concrete truck alignment system with the sensor on the loading station to calculate a hopper offset to help with alignment.

FIG. 4 illustrates a block diagram 400 of a concrete truck alignment system with a sensor 402 mounted on a loading station 108. The loading station 108 may have the sensor 402, a discharge chute 112 and environmental dust shields 404. A concrete truck 104 has a feed hopper 110. The sensor 402 detects the feed hopper 110 and sends a signal to a computer 406. The computer 406 uses the signal to calculate a hopper offset. The computer 406 may provide the hopper offset to an alignment feedback unit 408. The position of the concrete truck 104 may be adjusted using the hopper offset provided by the alignment feedback unit 408 till the hopper offset is within an alignment tolerance and thus the discharge chute 112 is aligned to the feed hopper 110.

In this document a concrete truck 104 includes a concrete mixer truck 104A and a cement hauler 104B.

In this document a loading station 108 includes a concrete loading station 108A or a cement loading station 108B.

In this document a feed hopper 110 may be a feed hopper 110A or an intake hatch 110B and 110C.

In this document a discharge chute 112 may be a concrete discharge chute 112A or a cement discharge chute 112B.

The environmental dust shield 404 is also known as a dust shroud, rubber shield, or dust shield. The environmental dust shield 404 encloses an area around the discharge chute 112 and that combined with other dust control technologies like an overhead vacuum as part of an evacuating dust collector that can keep the amount of dust exiting the loading station 108 down to a small amount and in compliance with regulations. The environmental dust shield 404 may be made out of rubber, plastic, fabric or other suitable material that is flexible to allow it to be pushed aside or contacted by the feed hopper and not be damaged. The environmental dust shield 404 may be made of translucent or opaque rubber or other flexible material that will contain the dust to help the evacuating dust collector contain the dust.

In operation as a concrete truck 104 enters the loading station 108, the sensor 402 may detect the location of the feed hopper 110. The sensor 402 may be able to see through the dust, water or the environmental dust shield 404. For example the sensor 402 may use a signal that is unaffected by the dust, water or the environmental dust shield 404. The sensor 402 may be located behind and work through the environmental dust shield 404. For example the sensor 402 may use radar, laser, thermal imaging or other technologies capable of seeing through dust, water or the environmental dust shield. The sensor 402 may use a high resolution Giga Hertz (GHz) frequency, millimeter wave radar to detect the location of the feed hopper 110. For example the radar may be in the 20 to 100 GHz range more specifically 21.65 GHz to 26.65 GHz (also known as 24 GHz Ultra Wide Band), 24.05 GHz to 24.25 GHz (also known as 24 GHz Narrow-Band ISM), or 76 GHz to 77 GHz (Automotive Long Range Radar, LRR band) or 77 GHz to 81 GHz (Automotive Medium Range Radar and Short Range Radar). The LR-560 model from Siemens is an example of a sensor 402 that uses 78 GHz millimeter radar for short range wideband, high-resolution detection that the system may use with the computer 406 to detect items like the feed hopper 110 and other targets.

The concrete truck alignment system may have the sensor 402 mounted at any number of locations on the loading station 108, for example as shown in block diagram 400 the sensor 402 may be mounted behind the discharge chute 112 and outside the environmental dust shield 404. The sensor 402 may be on the side of the loading station looking at the profile of the concrete truck 104 and feed hopper 110. Alternatively the system may have the sensor 402 mounted inside the environmental dust shield 404. Various other configurations are possible as well, for example overhead placement of the sensor 402 looking down on the concrete truck 104.

The sensor 402 may directly detect the feed hopper 110 because it is normally made of metal and typically the tallest part of the concrete truck 104, thus it may be good at reflecting the signal and provide clear detection of the location of the feed hopper 110. The concrete truck 104 may have a flat target surface attached to the feed hopper 110 or in a consistent location from the feed hopper 110 so that the computer 406 can calculate the hopper offset.

The sensor 402 may be able to determine the strength, direction and delay of the reflected signal to determine the position of an object and its potential size. The sensor 402 may have a built-in computer that can convert the reflected signals into a set of location information in the form of digital numbers, where each location information may be a detected object and may include a location and strength of the signal. The sensor may send location information about the set of digital numbers as a message to the computer 406.

The sensor 402 should have the resolution required to properly align the feed hopper 110 of the concrete truck 104. For example the resolution required may be 18 cm (about 7 inches). Or the resolution require may be 2.5 cm (about 1 inch).

The sensor 402 may generate a sensor signal, for example a radar signal, and then get a reflected signal back. If the sensor provides multiple possible targets then a number of approaches may be used to select the sensor signal representing the feed hopper 110. For example, the sensor signal closest to the expected location of the feed hopper 110 may be used. Certain sensor signals may be known to be part of the environment (e.g. support poles or walls for the loading station 108), and the system may ignore those. The size of the sensor signal found to correlate best to detecting the feed hopper 110 may be used. The largest sensor signal may be used, or maybe the sensor signal closest to the center may be used. The sensor may process the reflected sensor signal and the sensor may send location information to the computer 406, where the location information summarizes all the reflected signals. The sensor 402 or the computer 406 may determine the sensor signal that represents the feed hopper 110.

The components of the concrete truck alignment system may be grouped or split in various ways, for example the sensor 402 and the computer 406 may be one physical device, the sensor 402 may communicate via a wire or over the air (i.e. wirelessly), the computer 406 and the alignment feedback unit 408 may be in one physical device, the computer 406 may be split between the sensor 402 and the alignment feedback unit 408. The computer 406 and the alignment feedback unit 408 may be located on the concrete truck 104. Various other configurations are possible.

The computer 406 may calculate the precise position of the feed hopper 110 in relationship to the discharge chute 112 and store it in a hopper offset. The system may derive the hopper offset from the sensor signal, and the system may compare the hopper offset to an alignment tolerance. The system may consider the concrete truck 104 aligned if the hopper offset is in the range established by the alignment tolerance. In the aligned configuration it is expected that when material is sent down the discharge chute 112 it will enter the feed hopper 110.

The hopper offset may be various calculated numbers derived from the sensor signal, for example the hopper offset may be an offset vector, with the vector holding the forward-backward offset distance and the left-right offset distance. The hopper offset may be a distance and an angle, for example the feed hopper 110 maybe at angle 10 degrees to the right at a distance 61 cm (24 inches). The hopper offset may be just the forward-backward offset distance, skipping the left-right offset distance.

The system may define the hopper offset as the horizontal distance (ignoring height) between feed hopper 110 and the discharge chute 112 and the alignment tolerance as the maximum hopper offset where any material discharged from the discharge chute 112 will enter the feed hopper 110. The system may define the hopper offset as the horizontal distance (ignoring height) between feed hopper 110 and the discharge chute 112. For Example if the feed hopper opening is 75 cm (about 30") and the discharge chute is 30 cm (about 12") then the position of the feed hopper 110 needs to be about half of the diameter of the discharge chute so 15 cm (about 6") less than 75 cm, which would be about 60 cm (about 24"). If the sensor has measurement error of up-to 18 cm (about 7") then the alignment tolerance may need to be 18 cm less than 60 cm so about 42 cm or (about 17"). So the alignment tolerance may be 42 cm (about 17"), or more precise 18 cm (about 7"), or very precise 10 cm (about 4"). If the hopper offset is less than the alignment tolerance then the concrete truck 104 may be considered aligned.

The alignment tolerance is a number or a set of numbers the system may use to determine if the concrete truck 104 is aligned. The system considers the concrete truck 104 aligned if the hopper offset is within the range established by the alignment tolerance.

The alignment tolerance may be various numbers that correspond to the numbers represented in the hopper offset. For example, if the hopper offset is a vector then the alignment tolerance may be an (x, y) tolerance, with x being the front to back tolerance and the y being the left to right tolerance. In this case for the system to consider the cement truck aligned the hopper offset may need to be less in both the x and y tolerances. Alternatively if the hopper offset is a vector then the system may use a more complicated alignment tolerance for example taking into account the potential 'D' shaped top profile of the feed hopper 110.

If the hopper offset is a single number, for example forward-backward offset distance then the alignment tolerance may be a single number, and if hopper offset is less than the alignment tolerance then the system may consider the concrete truck 104 aligned.

The system may define the hopper offset as the distance between the center of the feed hopper 110 and the center of the discharge chute 112, for example the alignment tolerance may be 18 cm (about 7"). With this definition the system may consider the concrete truck 104 aligned if the hopper offset is less the 18 cm.

The alignment tolerance may be bidirectional, as has been described with the alignment tolerance being a number that applies equally to positive or negative values. Alternatively the alignment tolerance may be unidirectional, where a positive value in the hopper offset may have one tolerance and a negative number may have a different value. For example to better account for the 'D' shape of the feed hopper 110, if the hopper offset is the forward-backward offset distance with a positive value indicating the feed hopper 110 needs to have the round edge of the 'D' approach to discharge chute 112 more than the positive tolerance may be within 42 cm (about 17"). The negative tolerance (indicating the feed hopper 110 straight edge needs to move away from the discharge chute 112 then the negative tolerance may be within 20 cm (about 8").

The alignment feedback unit 408 may be an electronic display that aids the operator in positioning the concrete truck 104 so the feed hopper 110 aligns to the discharge chute 112. The alignment feedback unit 408 provides feedback and may include graphical feedback, auditory feedback, both graphical and auditory feedback or other feedback (example haptic, like vibration). The feedback may inform a truck driver of the proximity of the feed hopper 110 to the discharge chute 112. The alignment feedback unit 408 may provide the hopper offset digitally to an electronic self-driving system to have the concrete truck 104 align the feed hopper 110 to the discharge chute 112.

The alignment feedback unit 408 may be located inside the concrete truck 104 to aid the driver with the alignment. For example the alignment feedback unit 408 may be a dedicated device and be permanently mounted in the concrete truck 104, or the alignment feedback unit 408 may be for general purposes that include providing hopper offset information. Alternatively the alignment feedback unit 408 may be a portable electronic device like a cell phone and the feedback given by accessing a particular network address, for example an IP (Internet Protocol) address or an internet browser Uniform Resource Locator (URL). The system may have the alignment feedback unit 408 attached to or located on the loading station 108.

By using the alignment feedback unit 408 the loading station staff or terminal filling operator may guide a concrete truck 104 into position without having to visually see the discharge chute 112 or the feed hopper 110.

The auditory feedback maybe beeping that increases in frequency as the concrete truck 104 improves the alignment and the beeping may conclude with a solid tone when the hopper offset is within the alignment tolerance.

Figure 5A:
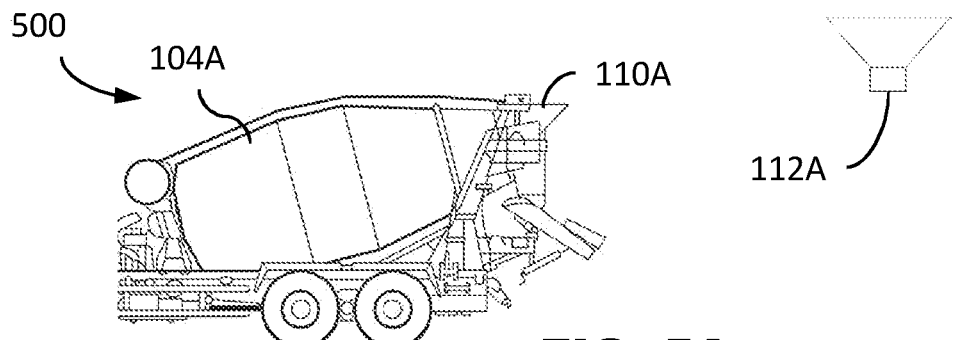
FIGS. 5A and 5B show a side and top view of the concrete truck aligning to a discharge chute.

FIG. 5A illustrates a side view 500 of a concrete mixer truck 104A with the feed hopper 110A starting to align to the concrete discharge chute 112A.

Figure 5B:
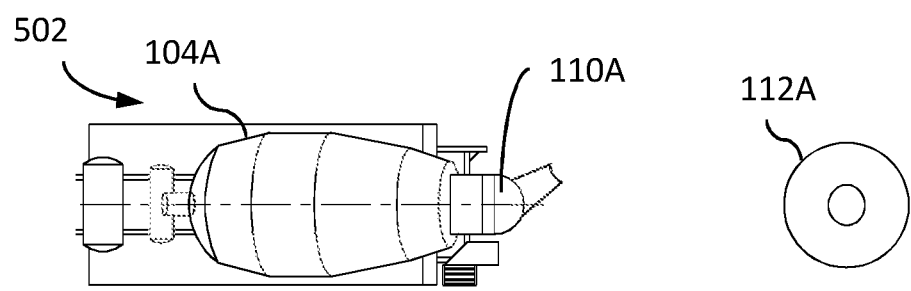

FIG. 5B illustrates a top view 502 of the concrete mixer truck 104A with the feed hopper 110A starting to align to the concrete discharge chute 112A.

Figure 5C:
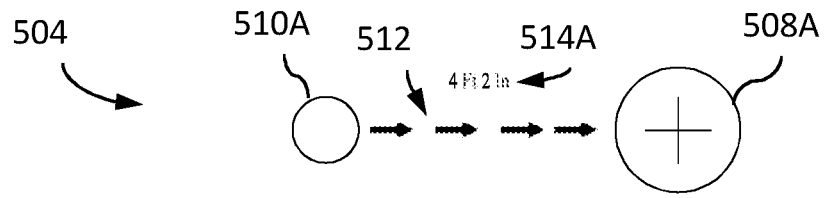
FIGS. 5C and 5D show two potential display graphics for an alignment feedback unit to show the hopper offset.

FIG. 5C illustrates a potential display graphic 504 for the alignment feedback unit 408 to show the hopper offset. The system may show the display graphic 504 on an electronic display screen. The display graphic 504 illustrates how the system may show the hopper offset graphically, and numerically. The graphical display of the hopper offset may convey the location of the feed hopper 110 relative to the discharge chute 112.

The display graphic 504 shows a discharge icon 508A and a hopper icon 510A. The system may have the discharge icon 508A remaining in the same location in the display graphic 504 and the hopper icon 510A may be positioned based on the hopper offset, so as the concrete truck 104 moves the hopper icon 510A may also move in synchrony. For example the system may display the location of the hopper icon 510A offset from the discharge icon 508A based on a scaled representation of the hopper offset. The system may scale the hopper offset and represent every 1 meter (about 3 feet) in the real world as 10 cm (about 4 inches) on a large display, or maybe 2.5 cm (about 1 inch) on a smaller display.

The discharge icon 508A may indicate the desired position that the hopper icon 510A needs to move to align the feed hopper 110 to the discharge chute 112.

The system may depict the discharge icon 508A in various ways, for example cross hairs, a circle, a circle with crosshairs, two concentric circles, a bullseye, or other symbols to indicate the desired target position that the hopper icon 510A should be moved to.

The display graphic 504 also shows the hopper offset as a numerical display 514A as the distance in feet and inches the concrete truck 104 needs to backup.

The display graphic 504 also shows the hopper offset as a series of arrows 512 that the concrete truck 104 needs to backup. As the concrete truck 104 gets the feed hopper 110 closer to the target position of being under the discharge chute 112 then the hopper offset may approach zero. At some point the hopper offset may be within the alignment tolerance and the alignment feedback unit 408 may indicate the truck is aligned, for example the system may change the color to green, start flashing or provide other graphical or auditory indicators. The color of the discharge icon 508 may turn green. The system may indicate alignment by displaying a missile lock on indicator, or a lock symbol, the words "done," "aligned," "locked on" or "target acquired" or other adjustment to the graphic to indicate that alignment is achieved.

Figure 5D:
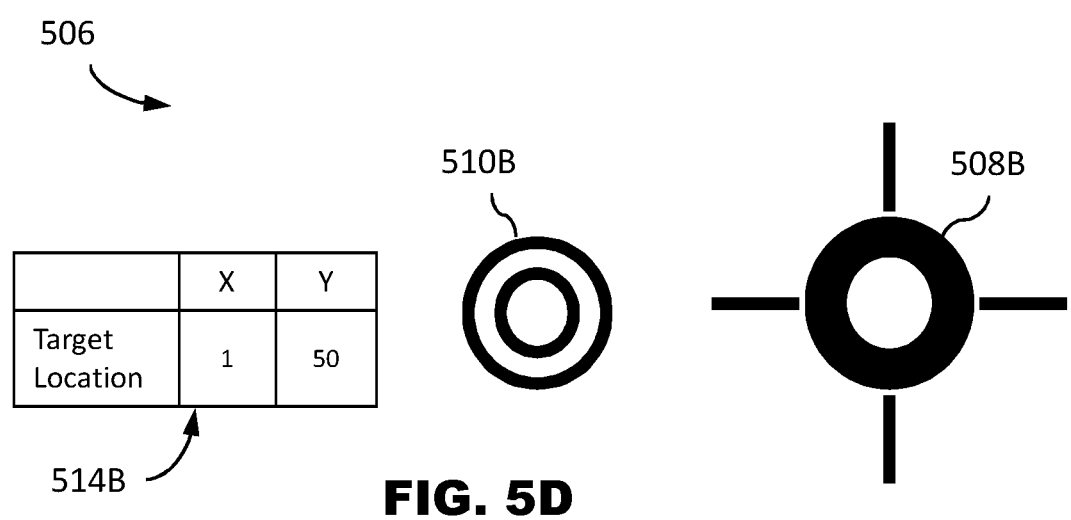

FIG. 5D illustrates a potential display graphic 506 for the alignment feedback unit 408 to show the hopper offset graphically and numerically.

The display graphic 506 has a discharge icon 508B represented by a solid "O" circle with cross hairs and the hopper icon 510B is a second outlined "O" circle that moves toward the target (i.e. the discharge icon 508B) as the concrete truck 104 backs up to reduce the hopper offset.

The display graphic 506 also shows the hopper offset in a numerical display 514B as the table of the forward-backward distance labeled "x" and the left-right distance labeled "y."

Figure 6:
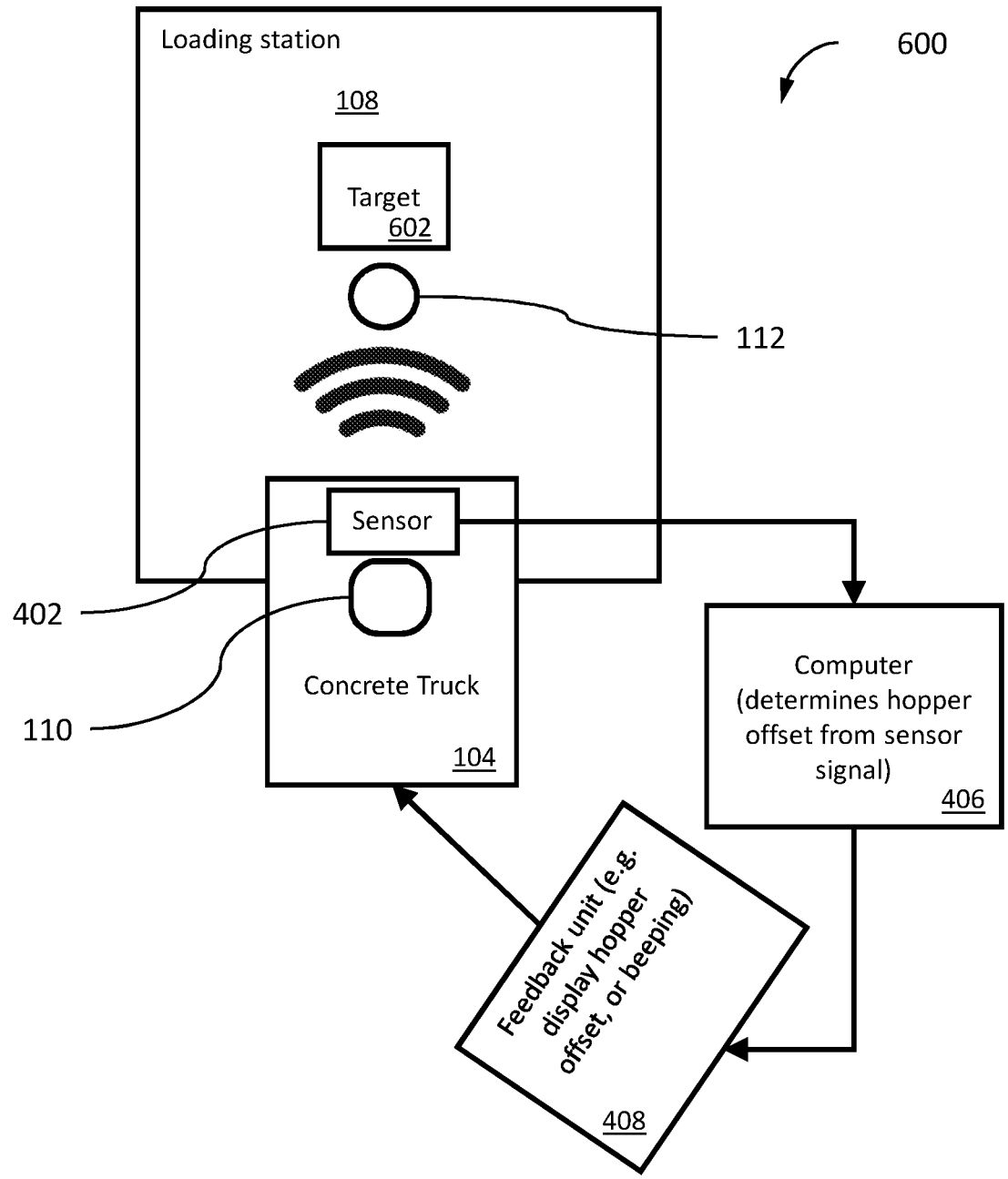
FIG. 6 is a diagram of a concrete truck alignment system with the sensor on the concrete truck to calculate the hopper offset to help with alignment.

FIG. 6 illustrates a block diagram 600 of a concrete truck alignment system with the sensor 402 mounted on the concrete truck 104. Block diagram 600 is similar to block diagram 400 except sensor 402 is mounted on the concrete truck 104 and the sensor signal is about a stationary target 602 that is mounted on the loading station 108. As a concrete truck 104 enters the loading station 108, the sensor 402 on the moving concrete truck 104 may detect the stationary target 602 and send a signal or location information to the computer 406. The computer 406 may use the location information to calculate the hopper offset. Further processing of the hopper offset continues as described previously.

Figure 7:
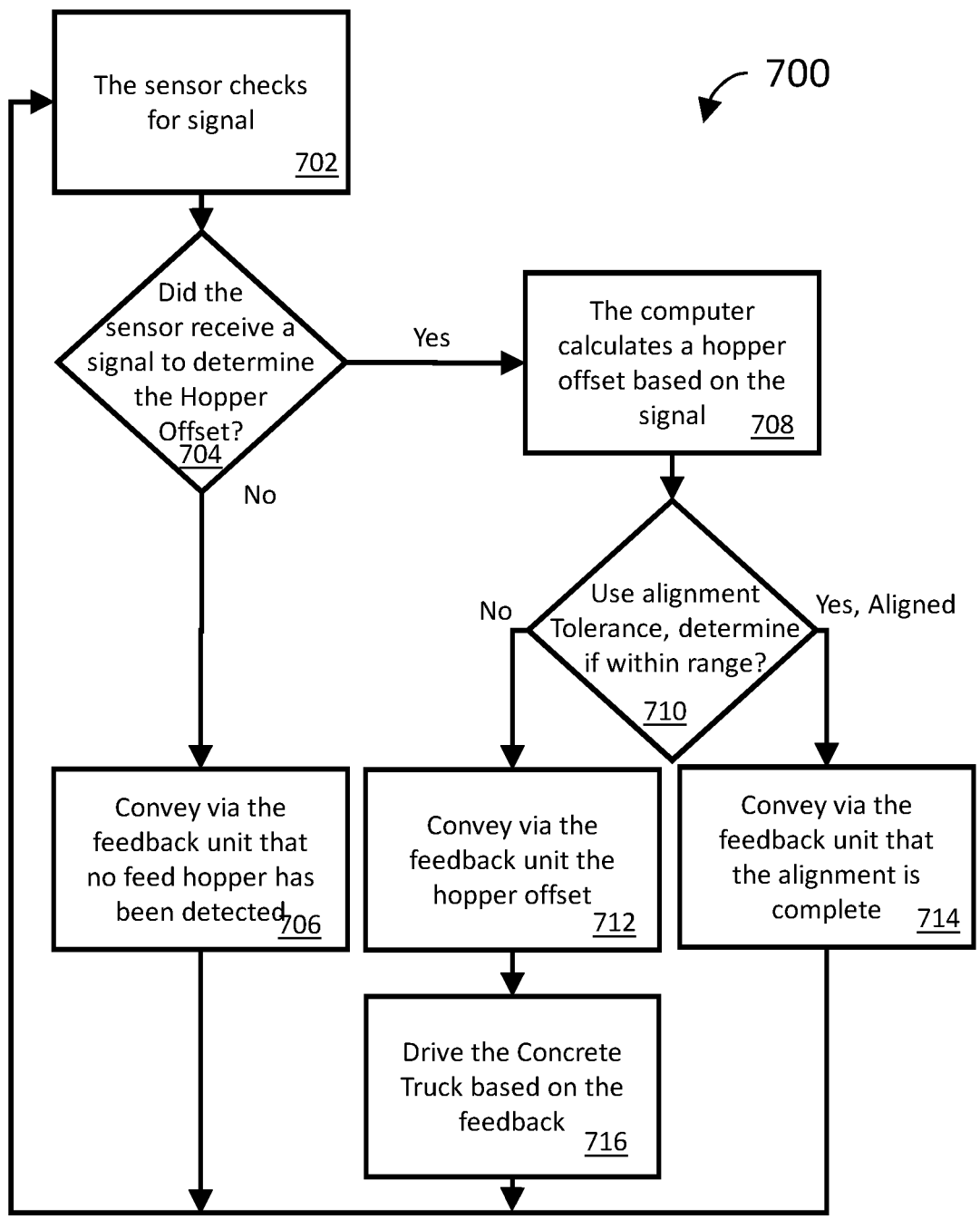
FIG. 7 illustrates a flow chart of a concrete truck alignment system.

FIG. 7 illustrates one potential process flow 700 of the concrete truck alignment system.

The process flow 700 may start at box 702 where the sensor 402 may check for signals for objects in the loading station 108. The sensor may send off a signal and wait to get signals reflected back.

Next at decision diamond 704 the process flow 700 may continue and the system may determine if the sensor 402 received a signal that is likely to represent something that the system can use to determine the hopper offset. For example did the sensor 402 receive a signal that is the right location, strength, or other criteria that the system would expect a feed hopper 110 or a target to generate? The system may ignore signals below a baseline level. If the system has the sensor 402 mounted on the loading station 108 then there may be a consistent set of identified features reported by the sensor 402 when no concrete truck 104 is present. This set of consistent background features may be stored as a set of baseline signals. When the system takes the current signals that the sensor 402 is reporting and removes the set of baseline signals then the system may be left with an active signal. The system may monitor the active signal to see if it changes and is increases in strength, if it does it may indicate the concrete truck 104 is moving into position. An increasing signals may indicate to the system that the system has acquired a signal from the concrete truck 104 and that active signal may be used to determine the hopper offset. If the sensor 402 failed to receive a signal that the system can use to determine the hopper offset then the process flow 700 may continue at box 706. If the sensor 402 received a signal that the system can use to determine the hopper offset then the process flow 700 may continue at box 708.

At box 706 the process flow 700 may convey via the alignment feedback unit 408 that the system failed to detect a feed hopper 110. For example, if the alignment feedback unit 408 is providing a graphical display then the hopper icon 510 may be missing from the display graphic. If the alignment feedback unit 408 is providing auditory feedback then the system may provide silence. Next the process flow 700 may return to box 702.

At box 708 the process flow 700 may have the computer 406 process any received signals to calculate a hopper offset. For example if it is known that the strongest signal is likely to be a direct detection of the feed hopper 110 then the system may convert the location provided by the strongest signal into a hopper x and hopper y location relative to the sensor 402 location. The system may know the location of the discharge chute 112 (discharge x and discharge y) then the hopper offset can be determined by subtracting the discharge location from the hopper location so if the discharge x is 150 cm (about 5 feet), and the discharge y is 0 cm, and the hopper x is 300 cm (about 10 ft), and the hopper y is 30 cm (about 1 foot), then the hopper offset would be 150 cm x, and 30 cm y (about 5 ft x, 1 ft y). Once the process flow 700 completes the tasks in box 708 then the process flow 700 may continue at decision diamond 710.

At decision diamond 710 the process flow 700 may compare the hopper offset to the alignment tolerance and see if the hopper offset is within range of the alignment tolerance? If the hopper offset fails to be in the range of the alignment tolerance then the process flow 700 may continue at box 712. If the hopper offset is within the range of the alignment tolerance then the process flow 700 may continue at box 714.

At box 714 the process flow 700 may convey via the alignment feedback unit that the alignment is complete. Next the process flow 700 may return to box 702.

At box 712 the process flow 700 may convey the hopper offset via the alignment feedback unit 408. Next the process flow 700 may continue to box 716.

At box 716 process flow 700 may adjust the position of the concrete truck 104 in a number of ways, for example by a driver of the concrete truck 104 based on the hopper offset as conveyed by the alignment feedback unit 408, may drive the concrete truck to reduce the hopper Offset. Alternatively the concrete truck may autonomously drive the concrete truck 104 using the hopper offset to align the feed hopper 110. Next the process flow 700 may return to box 702.

The process flow 700 may continue in this loop so long as the system is powered on, or in the run configuration.

Figure 8:
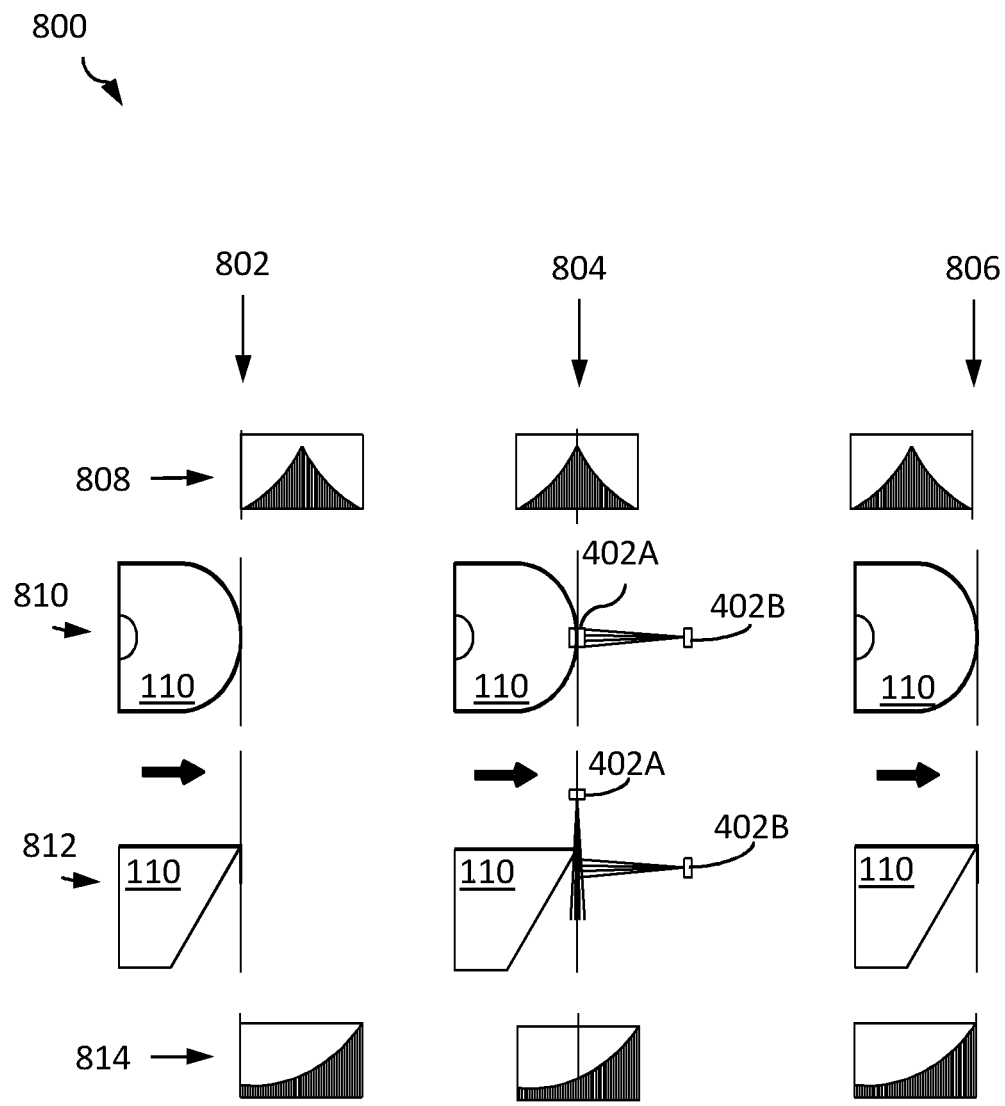
FIG. 8 illustrates the sensor output for a concrete truck alignment system with dual sensors on the loading station and the feed hopper in different positions of alignment.

FIG. 8 shows illustration 800 of the sensor output for a concrete truck alignment system with dual sensors. Specifically a ceiling sensor 402A and a back-wall sensor 402B on the loading station 108 with the feed hopper 110 in a forward position 802, and aligned position 804 and a too-far back position 806. The top row 808 shows the signal strength output from the ceiling sensor 402A. The second row 810 shows the top view of the feed hopper 110. The third row 812 shows the side view of the feed hopper 110. The fourth row 814 shows the signal strength output for the back-wall sensor 402B. The ceiling sensor 402A and back-wall sensor 402B are illustrated for the aligned position 804, and are not shown in the forward position 802 nor the too-far back position 806.

With the system having the ceiling sensor 402A the system may use three dimensions of the signals to determine a more accurate hopper offset. The system may use the forward to backward component of the signal from the back-wall sensor 402B and directly determine the forward and backward component of the hopper offset. The system may use the left to right component of the back-wall sensor 402B to determine directly the left to right component of the hopper offset. The system may use the signal from the ceiling sensor 402A to detect the lip of the feed hopper 110 since the lip of the feed hopper 110 is at the maximum height of the truck. As the concrete truck 104 moves into position the system may improve on the forward to backward component direct measurement by using the vertical component. The vertical signal will be at the maximum as the radar detects the hopper lip. As the lip of the hopper passes the sensor 402 the signal will reduce. The maximum vertical signal is the signal detected as the hopper edge is directly underneath the sensor 402. The hopper edge may be about 1.25 cm (about 0.5 inches) in width.

A 77 GHz signal produces a narrow beam width and provides better resolution of a detected position compared to a 24 GHz radar and the 77 GHz reduces the required target area. Using this approach although the 77 GHz signal provides better resolution, the system may be able to use a lower resolution radar like 24 GHz to determine a more accurate hopper offset then a single sensor 402 concrete alignment system.

Figure 9:
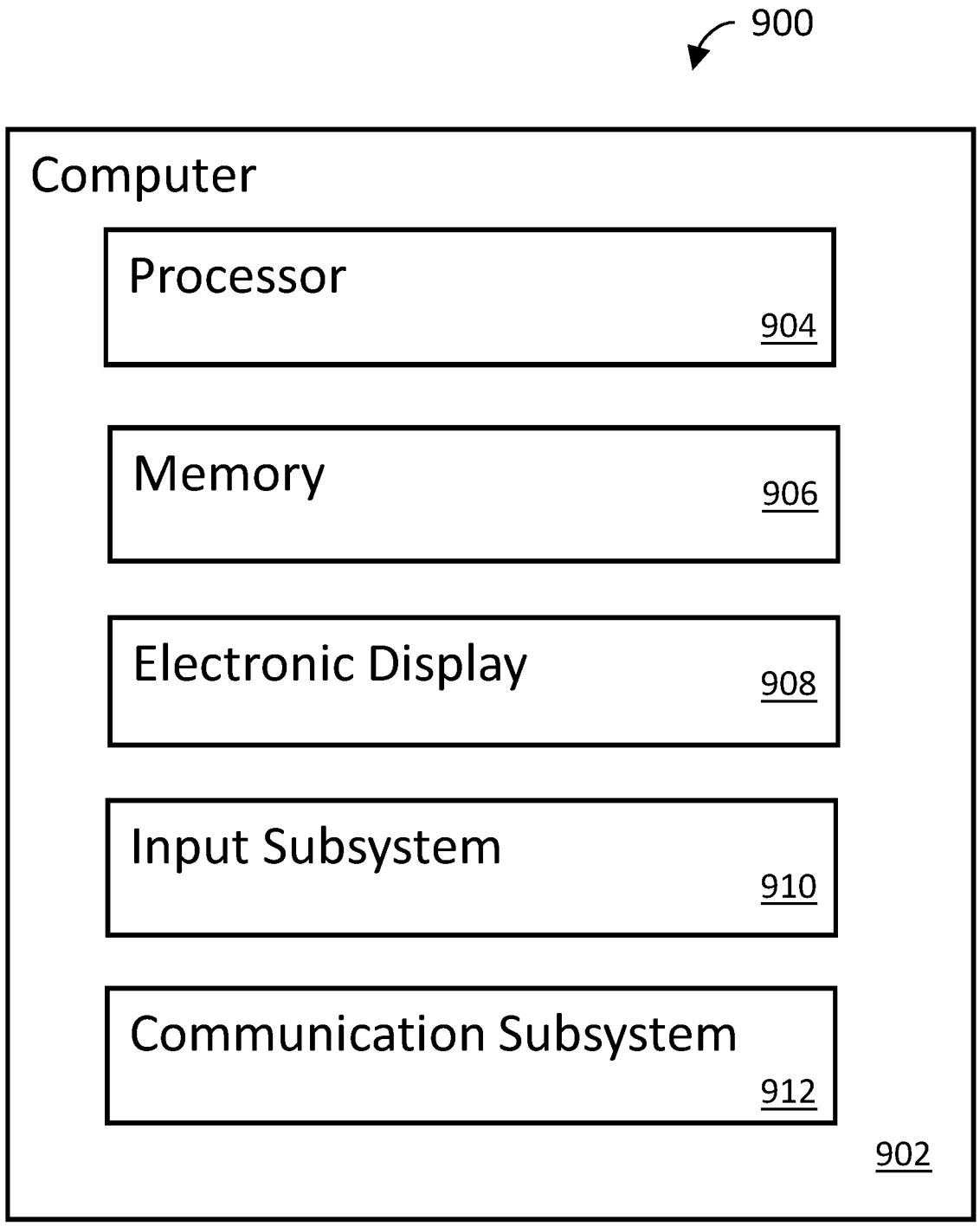
FIG. 9 illustrates a block diagram of a computing device.

FIG. 9 illustrates a block diagram 900 of a computing device 902. The computing device 902 may comprise a processor 904, a memory 906, a display control subsystem 908, an input subsystem 910, and a communication subsystem 912. The system may incorporate one or several computing device 902 into the computer 406, the sensor 402, the alignment feedback unit 408 or other elements of the system.

The system may configure the processor 904 to execute machine-readable instructions, and the processor 904 may execute the instructions on one or more virtual or physical electronic processing devices. For example, the processor 904 may execute instructions to perform the calculations, steps and processes described in this document. The processor 904 may include one or more processors to execute machine-readable instructions.

The memory 906 includes a computer-readable medium that contains instructions that the processor 904 could execute. The computer-readable medium (also referred to as a processor-readable medium) may include any non-transitory ephemeral (like not radio waves), or tangible medium that participates in providing data (e.g., instructions) that may be read by the processor 904 of the computing device 902. Such a medium may take many forms, including, but not limited to, non-volatile media and volatile media. Non-volatile media may include, for example, optical or magnetic disks, solid-state memory, a floppy disk, a flexible disk, a hard disk, a magnetic tape, any other magnetic medium, a CD, a CD-ROM, a DVD, any other optical medium, punch cards, paper tape, any other physical medium with patterns of holes, ROM (Read Only Memory), a PROM (Programmable Read-Only Memory), an EPROM (Erasable Programmable Read-Only Memory), a FLASH-EPROM, a USB drive (e.g. Thumb Drive), SD cards, any other memory chip or cartridge, other persistent memory, or any other medium from which a computer can read. Volatile media may include, for example, RAM (Random Access Memory) like static random-access memory (SRAM) or dynamic random-access memory (DRAM), which typically constitutes a main memory. The memory 906 stores information and computer-executable instructions necessary to carry out the processes described in this document.

The display control subsystem 908 facilitates displaying the media by sending signals to a display screen. The computing device 902 provides an integrated display control subsystem 908, memory 906, and processor 904 such that computing device 902 executes the machine-readable media to provide the functionality described in this document.

The input subsystem 910 receives input. The input subsystem 910 connects to and receives input from devices such as a mouse, a keyboard, a touch screen, a touch screen with a keyboard, a touch screen with a number keypad, a microphone, a camera. For example, a user may indicate that the computing device 902 is to execute a certain task, such as requesting the computing device 902 to display any of the information described in this document.

The communication subsystem 912 allows the execution of the methods described in this document over a network. For example, the communication subsystem 912 enables the computing device 902 to communicate with a plurality of other computing devices running the programs described in this document on other computing devices.

The communications subsystem 912 is configured to receive computer instructions for the processor 904, and those instructions are stored in the memory 906. The communication subsystem 912 is configured to communicate with a network by one or more transmission media, including wired (coaxial cables, copper wire and fiber optics, including the wires that comprise a system bus coupled to a processor of the computing device) or wireless.

The communication subsystem 912 may be equipped to communicate over many technologies that may be part of the network. For example, the communication subsystem 912 could be equipped with a Wi-Fi module that connects to mobile hotspots (via WiFi) which may connect to the internet. Wireless communication includes a cellular wireless network, Wi-Fi communications network, a wired Ethernet network, or any communication means that facilitate networked communication with other computing devices. In addition, the communication subsystem 912 may be capable of communicating via any number of short-range wireless technologies, for example, Bluetooth, Near Field Communication (NFC), ZigBee, infrared, Wide Area Network (WAN), etc. In general, the processor 904 is configured to receive instructions, for example from the memory 906 and execute those instructions, thereby performing the functions described in this document. Such instructions and other data are stored and transmitted using a variety of computer-readable media.

With regard to the processes, systems, methods, heuristics, etc. described in this document, it should be understood that, although the document describes the steps of such processes, etc. as occurring in a certain sequence, in practice the processes might follow a different sequence. Further, although the system may have described certain steps performed simultaneously, other steps may be added, or that certain steps described may be omitted. In other words, the descriptions of processes provided are for illustrating certain embodiments, and in no way limit the claims.

Accordingly, it is to be understood that the above description is intended to be illustrative and not restrictive. Many embodiments and applications other than the examples provided would be apparent upon reading the above description. The scope should not be determined with reference to the above description, but should instead be determined with reference to the appended claims, along with the full scope of equivalents to which such claims are entitled. It is anticipated and intended that future developments will occur in the technologies discussed in this document, and that the disclosed systems and methods will incorporate such future developments. In sum, it should be understood that the application is capable of modification and variation.

All terms used in the claims are intended to be given their broadest reasonable constructions and their ordinary meanings as understood by those knowledgeable in the technologies described unless there is an explicit indication to the contrary in this document. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, the following claims reflect inventive subject matter with less than all features of a single disclosed embodiment. The following claims are hereby incorporated into the Detailed Description, with each claim standing on its own as separately claimed subject matter.

What is claimed is:

1. A concrete truck alignment system comprising:
a loading station with a discharge chute,
a sensor that is electronic and sees through dust or an environmental dust shield, where the sensor provides location information used to determine a hopper offset, where the hopper offset is a physical distance measurement between a feed hopper on a concrete truck and the discharge chute.

2. The concrete truck alignment system of claim 1 further comprising an alignment feedback unit that provides feedback based on the hopper offset.

3. The concrete truck alignment system of claim 2 where the alignment feedback unit indicates if the hopper offset is within an alignment tolerance.

4. The concrete truck alignment system of claim 1 where the sensor can see through both dust and the environmental dust shield.

5. The concrete truck alignment system of claim 2 where the sensor uses radar.

6. The concrete truck alignment system of claim 1 where the sensor is mounted on the loading station.

7. The concrete truck alignment system of claim 1 where the sensor is mounted on the concrete truck.

8. The concrete truck alignment system of claim 2 where the alignment feedback unit provides auditory feedback.

9. The concrete truck alignment system of claim 2 where the alignment feedback unit provides graphical feedback.

10. The concrete truck alignment system of claim 9 where the alignment feedback unit shows a discharge icon representing the position of the discharge chute and a hopper icon representing the feed hopper where the location of the hopper icon is relative to the discharge icon and the relative location of the hopper icon is based on the hopper offset.

11. The concrete truck alignment system of claim 1 where the hopper offset indicates if the concrete truck should move forward or backward.

12. A concrete truck alignment method comprising:
receiving location information from an electronic sensor that sees through dust or an environmental dust shield,
determining a hopper offset from the location information where the hopper offset provides position information about a feed hopper on a concrete truck relative to a discharge chute on a loading station, and
providing feedback based on the hopper offset using an electronic feedback unit.

13. The concrete truck alignment method of claim 12 where the sensor can see through both dust and the environmental dust shield.

14. The concrete truck alignment method of claim 13 where the sensor uses radar.

15. The concrete truck alignment method of claim 12 where the providing feedback uses auditory feedback.

16. The concrete truck alignment method of claim 12 where the providing feedback uses graphical feedback.

17. The concrete truck alignment method of claim 16 where the providing feedback shows a discharge icon representing the position of the discharge chute and a hopper icon representing the feed hopper where the location of the hopper icon is relative to the discharge icon and the relative location is based on the hopper offset.

18. The concrete truck alignment method of claim 12 where providing feedback uses a computer network address.

19. The concrete truck alignment method of claim 12 where the sensor location information comes from a sensor that is mounted on the loading station.

20. A concrete truck alignment system comprising:
a loading station with a discharge chute,
a sensor that uses 20 to 100 GHz radar and provides location information, where the location information is used to determine a hopper offset, where the hopper offset is the distance between a feed hopper on a concrete truck and the discharge chute,
an alignment feedback unit that provides feedback based on the hopper offset, where the alignment feedback unit shows a discharge icon representing the position of the discharge chute and a hopper icon representing the feed hopper, where the location of the hopper icon is relative to the discharge icon and the relative location of the hopper icon is based on the hopper offset, and the alignment feedback unit indicates when the hopper offset is within an alignment tolerance.

\* \* \* \* \*